US012482988B2

(12) United States Patent
Martin

(10) Patent No.: US 12,482,988 B2
(45) Date of Patent: Nov. 25, 2025

(54) ELECTRICAL TERMINAL INCLUDING ROCKER LOCK

(71) Applicant: TE Connectivity Solutions GmbH, Schaffhausen (CH)

(72) Inventor: Galen M. Martin, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 320 days.

(21) Appl. No.: 18/303,211

(22) Filed: Apr. 19, 2023

(65) Prior Publication Data

US 2024/0356286 A1 Oct. 24, 2024

(51) Int. Cl.

*H01R 13/64* (2006.01)
*H01R 13/627* (2006.01)
*H01R 13/629* (2006.01)
*H01R 13/639* (2006.01)

(52) U.S. Cl.

CPC ......... *H01R 13/64* (2013.01); *H01R 13/6271* (2013.01); *H01R 13/62933* (2013.01); *H01R 13/639* (2013.01)

(58) Field of Classification Search

CPC ................ H01R 13/64; H01R 13/6271; H01R 13/62933; H01R 13/639; H01R 13/436; H01R 13/4361; H01R 13/4362

USPC ......................... 439/660, 744, 745, 746, 752

See application file for complete search history.

(56) References Cited

U.S. PATENT DOCUMENTS 4,705,337 A * 11/1987 Maeda ............... H01R 13/4223 439/748
5,980,331 A * 11/1999 Matsushita ........ H01R 13/4362 439/752
2001/0003078 A1* 6/2001 Kubo .................. H01R 13/432 439/747

* cited by examiner

*Primary Examiner* — Gary F Paumen

(57) ABSTRACT

An electrical connector assembly includes a connector body, a plurality of terminals arranged within the connector body, and a rotatable terminal lock. The plurality of terminals each include an elastic terminal latch fixing the terminal in an installed position within the connector body. The terminal lock is rotatably connected to the connector body between an unlocked position and a locked position. In the unlocked position a first portion of the terminal lock biases each of the terminal latches into a release state whereby the terminals may be removed from connector body in a removal direction. In the locked position a second portion of the terminal lock opposes each of the terminals in the removal direction.

20 Claims, 5 Drawing Sheets

ELECTRICAL TERMINAL INCLUDING ROCKER LOCK

FIELD OF THE INVENTION

The present invention relates to electrical connectors, and more particularly, to an electrical connector having a secondary lock which aids in the removal of installed terminals.

BACKGROUND

Reliable electrical connector systems must maintain the positional integrity of their conductive terminals while minimizing assembly errors. These errors include, for example, the incorrect or insufficient insertion of the terminals of the connector within a corresponding housing. As a result, in addition to primary locking or latching features of the terminals and connector, secondary terminal locking components and/or terminal position assurance (TPA) devices are often implemented. These systems not only ensure that partially seated terminals are detected during assembly of the connector system, but further reduce the risk that a terminal may be displaced from an installed position during connector use.

At the same time, it is advantageous to be able to remove the connector's terminals for replacement and/or recycling purposes. Currently, however, the terminal removal process is time consuming, often necessitating the release and removal of a single terminal at a time, and/or requiring multiple independent operations to disengage both the primary and secondary locking features of the terminal being removed.

Accordingly, there is a need for improved systems which facilitate the expedient removal of connector terminals, while maintaining their positional integrity in an assembled or operating state of the connector.

SUMMARY

In one embodiment of the present disclosure, an electrical connector assembly includes a connector body, a plurality of terminals arranged within the connector body, and a rotatable terminal lock. The plurality of terminals each include an elastic terminal latch fixing the terminal in an installed position within the connector body. The terminal lock is rotatably connected to the connector body between an unlocked position and a locked position. In the unlocked position a first portion of the terminal lock biases each of the terminal latches into a release state whereby the terminals may be removed from connector body in a removal direction. In the locked position a second portion of the terminal lock opposes each of the terminals in the removal direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
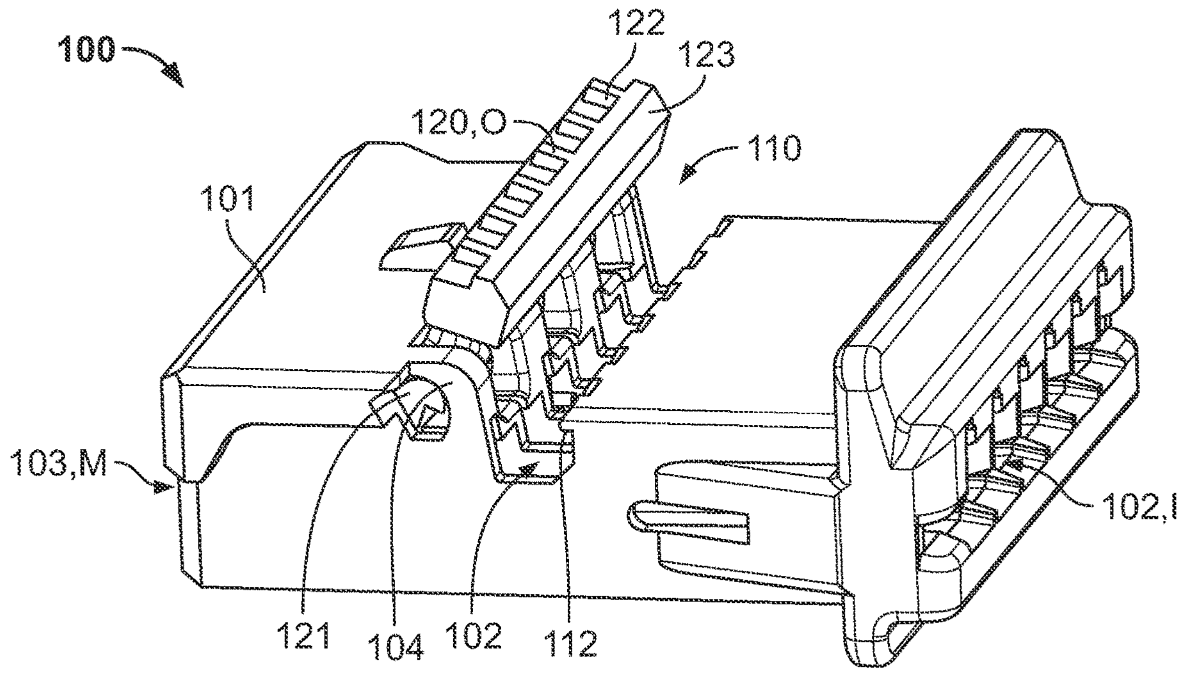
FIG. 1 is a side perspective view of an electrical connector according to an embodiment of the present disclosure with a terminal lock in an open or unlocked position.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a connector assembly having a connector body or housing defining a plurality of terminal openings for receiving a corresponding plurality of conductive terminals in an insertion direction. A rotatable terminal lock or secondary terminal locking device, also referred to herein as a locking arm, is rotatable connected to the housing, and is movable between an unlocked position and a locked position. Like prior art secondary locking devices, in the locked position the terminal lock opposes motion of inserted terminals in a removal direction. The terminal lock may also function as a type of terminal position assurance (TPA) device, wherein it cannot be placed into the locked position without the terminals being in a fully seated or installed position within the connector housing.

According to embodiments, as the terminal lock is moved from the locked position to the unlocked position it engages with the primary locking devices (e.g., elastic latches) of the terminals, biasing them from an engaged or locked state to a released or unlocked state. In this way, with a single movement of the terminal lock according to embodiments of the present disclosure, both primary and secondary terminal locking features of the terminal and/or connector are released, and the terminals are free to be removed from the connector housing (e.g., for replacement or for recycling purposes). This is an improvement over the prior art which, after release of a secondary terminal lock, each terminal must still have its primary lock or latch released by a separate operation in order to free each terminal for removal. Accordingly, embodiments of the present disclosure significantly improve the case and speed with which terminals may be released and removed from a connector assembly, without affecting the connector's ability to secure the terminals reliably and accurately in an installed state.

Figure 2:
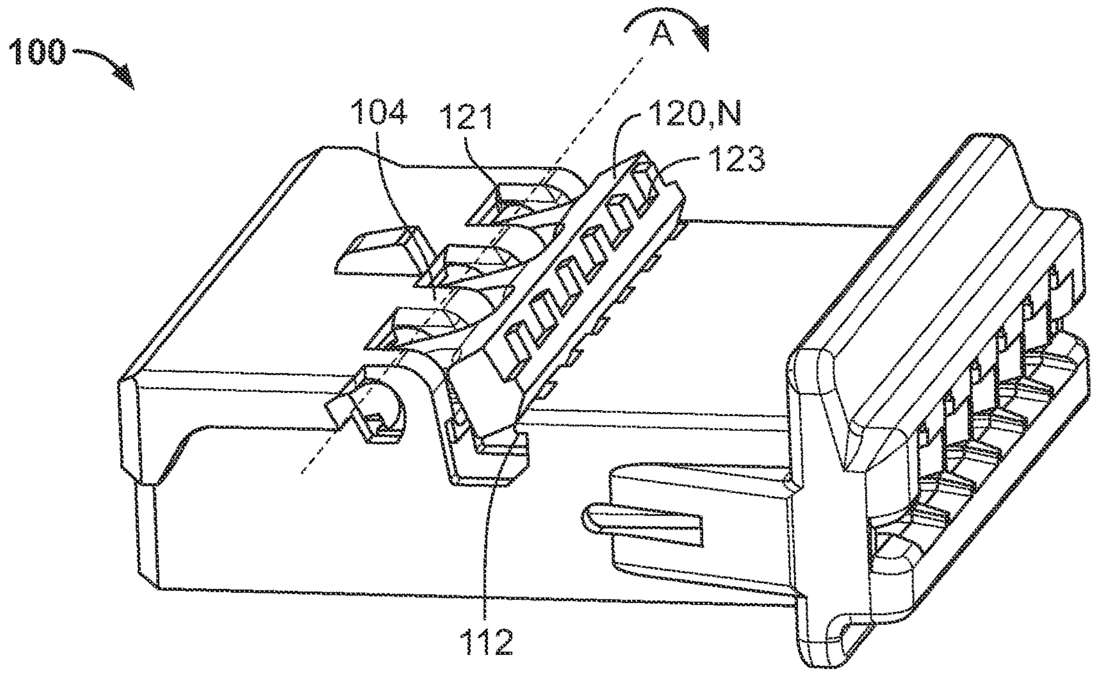
FIG. 2 is a side perspective view of the electrical connector of FIG. 1 with the terminal lock in an intermediate or neutral position.
Figure 3:
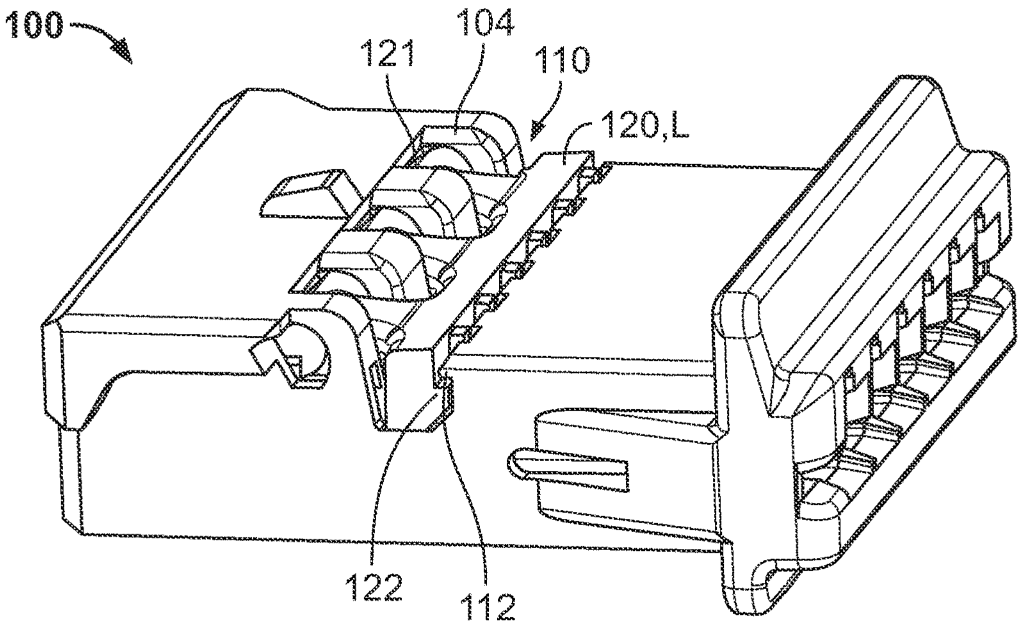
FIG. 3 is a side perspective view of the electrical connector of FIG. 1 with the terminal lock in a closed or locked position.

Referring generally to FIGS. 1-3, an exemplary connector or connector assembly 100 according to embodiments of the present disclosure is shown in each of three different operating positions. The assembly 100 generally includes a connector body or housing 101 (e.g., a molded polymer body) which may be formed monolithically, or from a plurality of discrete, assembled components. A plurality of terminal openings 102 are defined by and formed into the body 101. Each opening 102 is adapted to receive a corresponding conductive terminal in an insertion direction I. The body 101 further defines a mating end 103 adapted to engage with a mating connector in a mating direction M.

The assembly 100 further includes a rocking or rotating terminal lock or terminal locking device 120. FIG. 1 illustrates the terminal lock 120 in an open position O, while FIGS. 2 and 3 illustrate the terminal lock in an intermediate or neutral position N (FIG. 2) and a closed or locked position L (FIG. 3). In the locked position L, the terminal lock 120 is selectively received into a corresponding terminal lock opening or recess 110 formed into the body 101. As shown in FIG. 1, the recess 110 is in communication with each of the terminal openings 102.

The terminal lock 120 is rotatable between the open, neutral and locked positions about an axis of rotation A. Specifically, an axle-like portion 121 of the terminal lock 120 is rotatably supported via a bearing support or trunnion portion 104 defined by the housing 101. In embodiments, the axle-like portion 121 may be formed in segments, such that the terminal lock 120 may be snap-fit into place. In other embodiments, the housing 101 may be formed from multiple components, wherein the terminal lock 120 may be installed before final assembly and capture thereof. In other embodiments, additive manufacturing methods may be used to form the terminal lock 120 as one piece with a remainder of the housing 101.

The terminal lock 120 defines a lead-in surface or chamfer 123 and a latching surface 122. As shown in FIG. 2, the lead-in surface 123 aids the terminal lock 120 in being seated within the recess 110 as it is moved into the locked position L of FIG. 3. As shown in FIG. 3, in the locked position L, the latching surface 122 of the terminal lock 120 is held or opposed by a corresponding protruding latch or lip 112 defined by the housing 101 along an edge of the recess 110. In this way, once placed in the locked position shown in FIG. 3, the terminal lock 120 will remain locked until a sufficient amount of force is placed thereon to disengage the corresponding latching or locking features 112,122.

Figure 4:
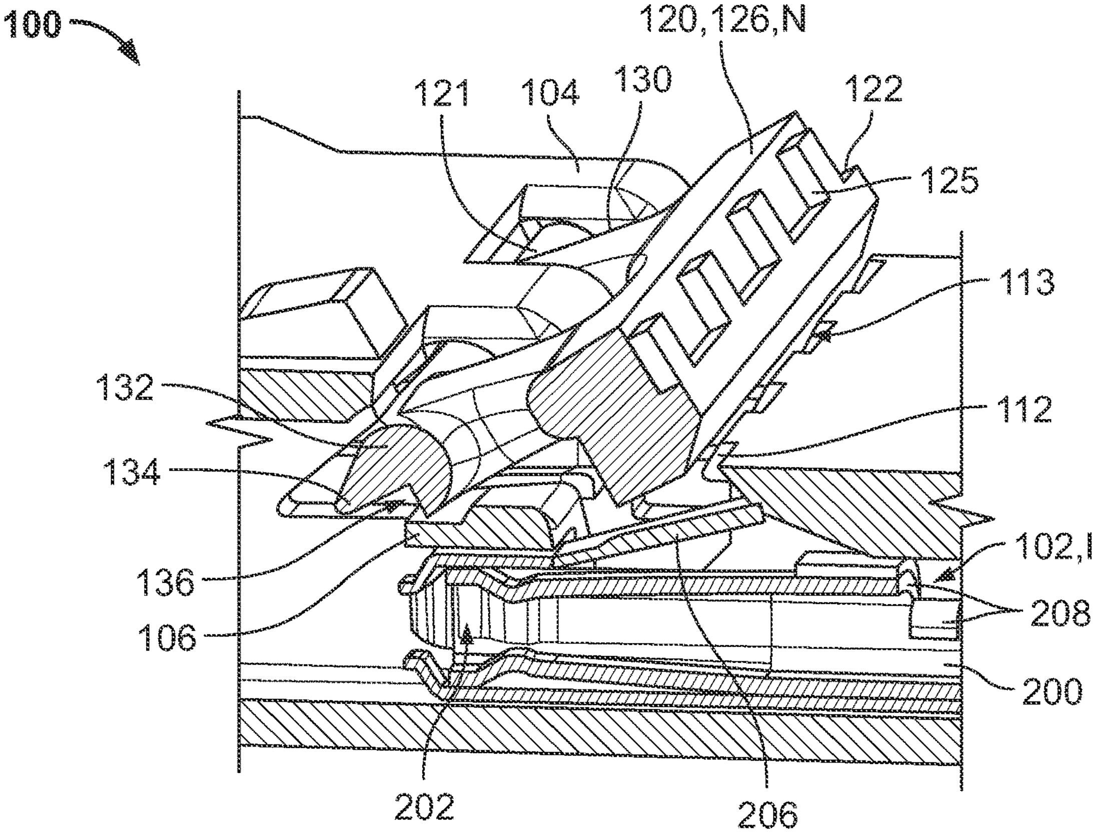
FIG. 4 is a partial side cross-sectional view of the electrical connector of FIG. 2 during a terminal insertion operation.

FIG. 4 is a partial cross-sectional view of the connector assembly 100 further illustrating an insertion operation of a conductive terminal 200. The exemplary terminal 200 includes a contact or front end 202, a rear or crimping end 204 (see FIG. 5A), and a primary latch or latch arm 206 (e.g., an elastic latch or arm). As shown, the latch 206 is cantilevered, having a free end extending opposite the insertion direction I. The terminal 200 further includes additional radially protruding features 208 which may function as locking surfaces for opposing the terminal lock 120 for performing its secondary locking function, as will be set forth in detail herein. With the terminal lock 120 in the neutral position N shown in FIG. 4 (or the open position O), the terminal 200 is free to be inserted into the terminal opening 102 in the insertion direction I. As the front end 202 of the terminal 200 is inserted, it passes a latch guide 106 arranged within the terminal opening 102, which will in-turn depress the latch 206 as it passes thereunder.

Still referring to FIG. 4, the terminal lock 120 may be described as including a locking block or body 126 connected to the axle-like portions 121 via a plurality of connecting arms 130. The locking block 126 may include a plurality of spaced vertical guides 125 corresponding to a plurality of slots 113 formed in the latch or lip 112 of the body 101. These features aid in maintaining the terminal lock 120 in proper alignment with the terminal openings 102 of the housing 101 in a lateral direction (i.e., along the axial direction of the rotational axis A). Further, the axle-like portion(s) 121 of the terminal lock 120 and/or the connecting arms 130 define latch release arms or cams 132 arranged on a side of the rotational axis A opposite the locking block 126. The latch release arms 132 may define a projection 134 extending in a direction generally away from the locking block 126. A recess or notch 136 may also be formed into the latch release arm 132, and is sized to receive a free end of the terminal latch 206. It should be understood that the profile of the illustrated and described latch release arm 132 may be continuous over the length of the terminal lock 120, or may only be present in areas corresponding to each of the plurality of terminals 200 to be held by the housing 101.

Figure 5A:
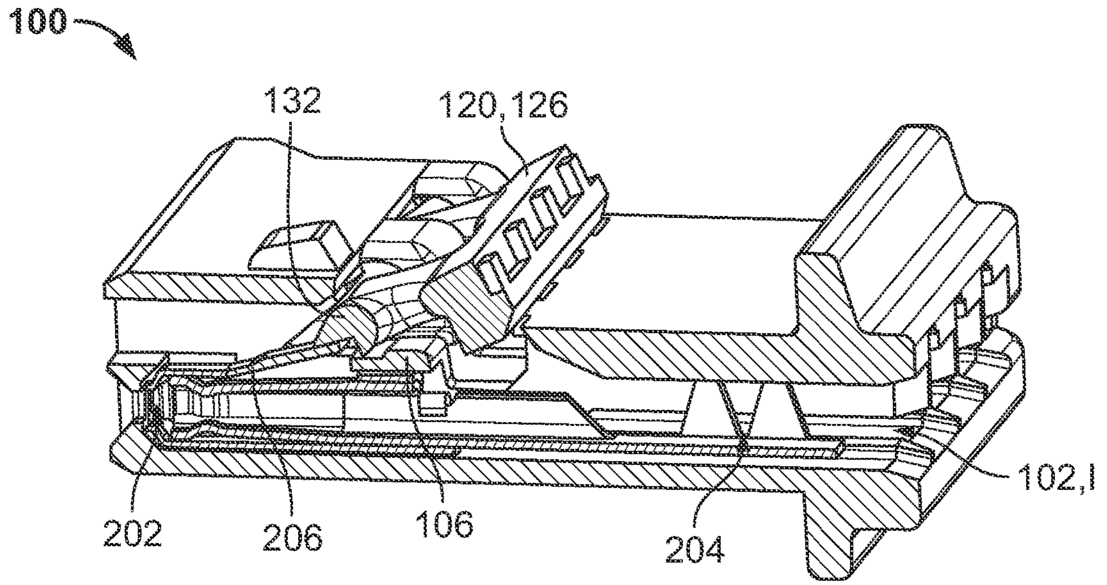
FIGS. 5A and 5B are side cross-sectional views of the electrical connector of FIG. 2 with the terminal in a fully inserted position.
Figure 5B:
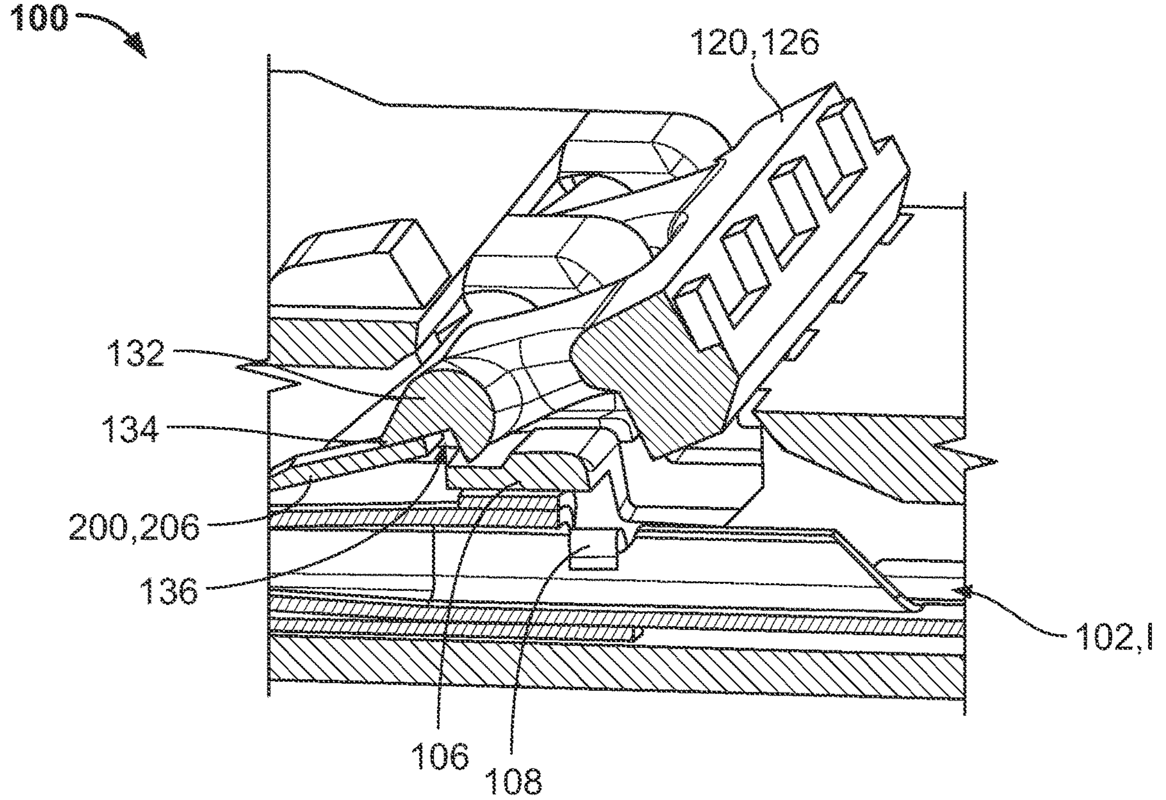
Figure 6A:
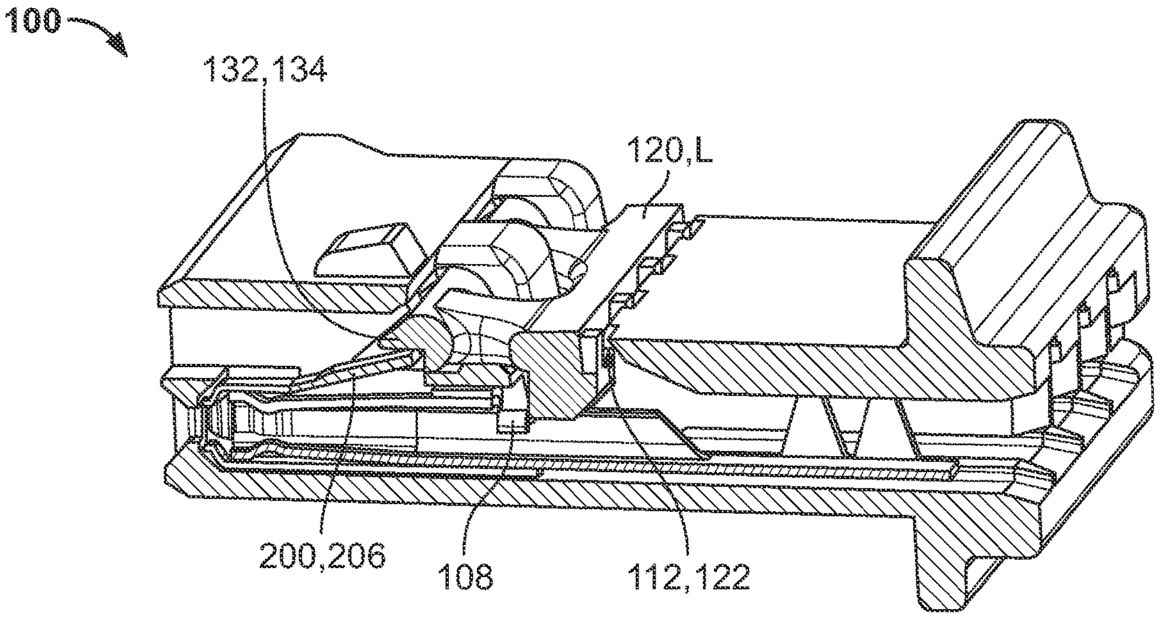
FIGS. 6A and 6B are side cross-sectional views of the electrical connector of FIG. 3 with the terminal in the fully inserted position.
Figure 6B:
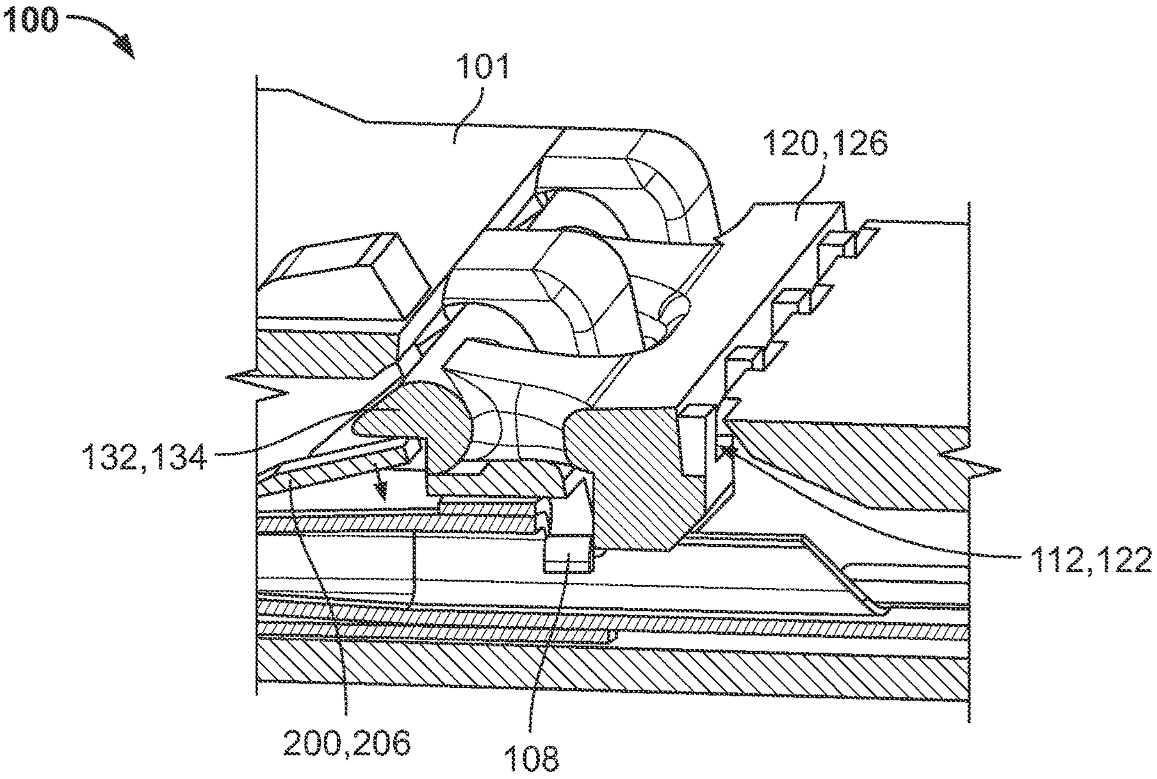

With reference now to FIGS. 5A and 5B, the terminal 200 is shown in a fully inserted position, wherein the front end 202 thereof is in abutting contact with a front of the terminal opening 102. The primary elastic latch 206 of the terminal 200 has passed under the latch guide 106, and has resiliently returned to a latching or locking position. In the exemplary embodiment, the free end of the latch 206 has returned into the notch 136 formed in the latch release arm 132. In this fully inserted position, each of the potential terminal secondary locking features 208 of the terminal 200 has passed the recess 110. In this way, from the neutral position N of the terminal lock 120 shown in FIGS. 5A and 5B, the terminal lock 120 is free to be rotated into the locked position L within the recess 110, as shown in FIGS. 6A and 6B. It should be understood, however, that if the terminal 200 were not fully inserted into the terminal opening 102, the locking projections 208 of the terminal would prevent the terminal lock 120 from being placed into the locked position. In this way, a TPA function is also achieved by the terminal lock 120.

Referring now to FIGS. 6A and 6B, the terminal lock 120 is shown rotated into the locked position L, and held therein via the corresponding latching features 112,122. Despite its further rotation, the notch 136 of the latch release arm 132 still retains the free end of the primary terminal latch 206 therein. Specifically, a rear wall defining the notch 206 opposes the free end of the terminal latch 206 in a terminal removal direction (i.e., a direction opposite the insertion direction I). In this way, the terminal 200 is held in place via the engagement of its primary latching mechanism (i.e., latch 206) with a first portion of the terminal lock 120 (e.g., the latch release arm 132). Likewise, the locking block 126 of the terminal lock 120 is held securely behind the locking feature(s) 208 of the terminal 200, opposing it in the removal direction of the terminal. In this way, in the locked position of the terminal lock 120, the secondary terminal lock function is also realized.

According to the prior art, removing the terminal 200 from the position shown in FIGS. 6A and 6B may include, for example, releasing the terminal lock from the locked position, and manually depressing the primary terminal latch to release it (e.g., through an access window in the connector housing 101). Moreover, a user may be required to hold the primary terminal latch in a released position as it is being drawn out of the housing in the removal direction. This process is time consuming, and generally requires that each of the terminals be released on an individual basis. Embodiments of the present disclosure significantly improve one's ability to quickly and efficiently remove one or more of the terminals.

Figure 7:
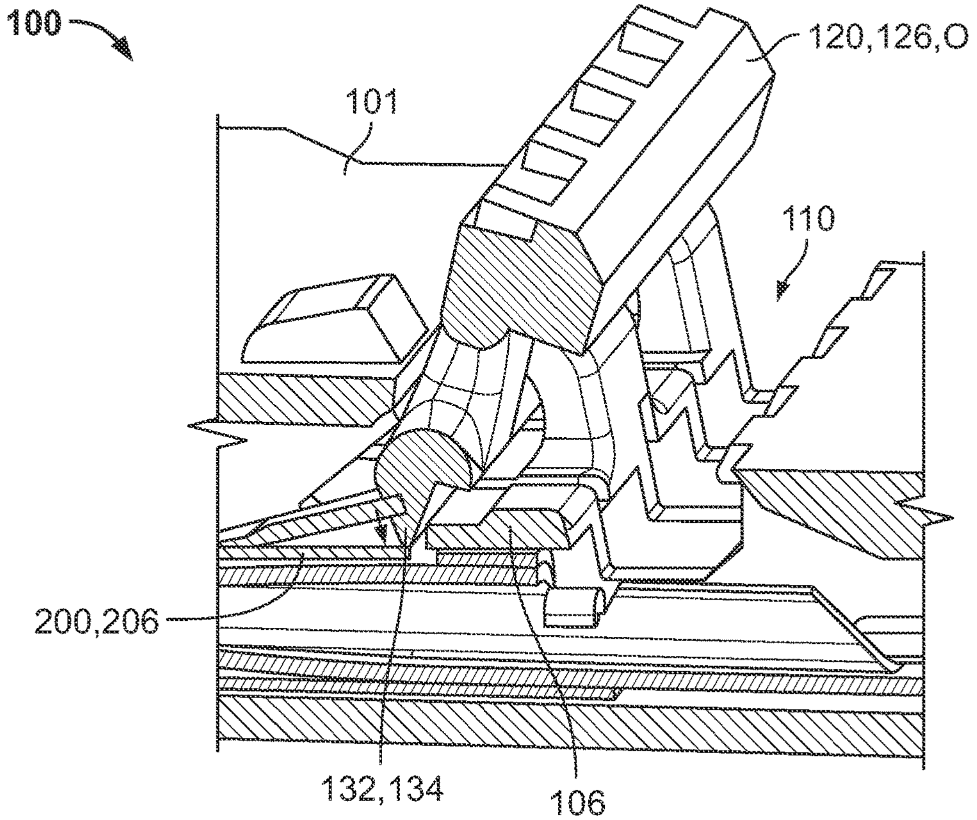
FIG. 7 is a partial side cross-sectional view of the electrical connector of FIG. 1 with a primary locking latch of the terminal in a deflected state.
Figure 8:
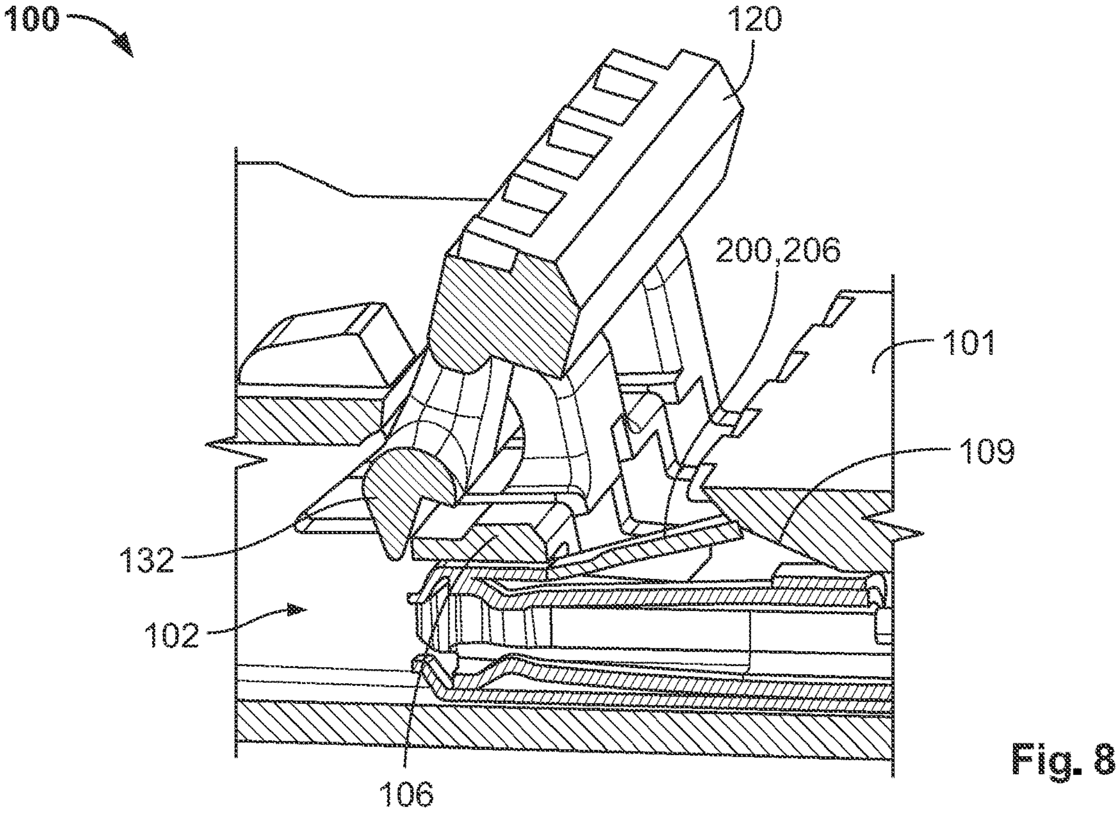
FIG. 8 is a partial side cross-sectional view of the electrical connector of FIG. 7 with the terminal partially removed.

Specifically, referring now to FIG. 7, an operator may rotate the terminal lock 120 counter clockwise about its rotational axis through the neutral position N and into the open position O. As shown, moving the terminal lock 120 into the open position O is met with elastic resistance as each of the terminal latches 206 is biased in the downward direction shown by the protruding end 134 of latch release arm 132. Continued rotation of the terminal lock 120 will bias the latch 206 into a released position or state, wherein it has been deflected sufficiently enough to clear the latch guide 106 in the removal direction. In this way, not only has the secondary terminal lock been released by the rotation of the locking block 126 out of the recess 110, but the terminal latch 206 has also been disengaged. In the illustrated released position, the terminal 200 may be moved freely in the removal direction (e.g., via a tension force placed on the terminal 200 by a user). As shown in FIG. 8, with the terminal 200 partially removed, the primary latch 206 may at least partially resiliently return to a locked or latched position. However, an opposing top wall of the terminal opening 102 defines a tapered surface 109 that will act to deflect the latch 206 downward, permitting the continued removal of the terminal 200.

It should be understood that while only a single terminal is shown, the above-described operations would be the same or similar for each terminal installed within the connector housing 101. Likewise, it should be understood that embodiments of the present disclosure may operate as described above on each of the terminals simultaneously, eliminating the often one-by-one nature of terminal removal/replacement operations of prior art arrangements.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector assembly, comprising:

a connector body;

a plurality of terminals arranged within the connector body, each terminal including an elastic terminal latch fixing the terminal in an installed position within the connector body; and a terminal lock rotatably connected to the connector body between an unlocked position and a locked position, in the unlocked position a first portion of the terminal lock biases each of the terminal latches into a release state whereby the terminals may be removed from the connector body in a removal direction, and in the locked position a second portion of the terminal lock opposes each of the terminals in the removal direction.

2. The electrical connector according to claim 1, wherein in the locked position, the first portion of the terminal lock opposes each of the elastic terminal latches in the removal direction.

3. The electrical connector according to claim 2, wherein the terminal lock is rotatable relative to the connector body about a rotational axis extending in a direction generally perpendicular to an insertion direction of the terminals.

4. The electrical connector according to claim 3, wherein the first portion of the terminal lock includes at least one latch release arm aligned with the plurality of terminals, and the second portion of the terminal lock includes a locking body.

5. The electrical connector according to claim 4, wherein the at least one latch release arm and the locking body are arranged on distinct sides of the rotational axis of the terminal lock.

6. The electrical connector according to claim 5, wherein rotating the locking body out of an opposing position relative to the terminals in the removal direction rotates the at least one latch release arm into contact with the terminal latches.

7. The electrical connector according to claim 1, wherein the first portion of the terminal lock defines a notch receiving a free end of the terminal latches with the terminal lock in the locked position.

8. The electrical connector according to claim 1, wherein the connector body defines an opening receiving the second portion of the terminal lock with the terminal lock in the locked position.

9. An electrical connector, comprising:

a connector body defining a plurality of terminal openings; and a terminal lock rotatably connected to the connector body about a rotational axis between an open position and a closed position, the terminal lock including:

a latch end defined on a first side of the rotational axis and adapted to engage with a primary latch of a terminal inserted into one of the terminal openings; and a lock surface on a second side of the rotational axis and adapted to selectively oppose a locking feature of the terminal for defining a secondary terminal lock.

10. The electrical connector according to claim 9, wherein, with the terminal lock in the open position, terminals are freely insertable into the terminal openings.

11. The electrical connector according to claim 9, wherein, with the terminal lock in the closed position and a terminal installed within one of the terminal openings:

the latch end is adapted to engage with the primary latch of the terminal for retaining the terminal within the terminal opening; and the lock surface is adapted to oppose the locking feature of the terminal in a removal direction of the terminal.

12. The electrical connector according to claim 11, wherein, with the terminal lock in the open position and a terminal installed within one of the terminal openings:

the latch end is adapted to disengage the latch of the terminal from a locked position for permitting removal of the terminal from the terminal opening; and the lock surface is adapted to be biased out of an opposing position with the locking feature of the terminal.

13. The electrical connector according to claim 11, wherein the latch end defines a notch adapted to receive a free end of the primary latch of the terminal in the closed position of the terminal lock.

14. The electrical connector according to claim 13, wherein, with the terminal lock in the closed position, the free end of the latch opposes a surface of the notch in the removal direction of the terminal.

15. The electrical connector according to claim 9, wherein the connector body defines an opening receiving the second side of the terminal lock with the terminal lock in the closed position.

16. The electrical connector according to claim 15, wherein at least one of the connector body or the terminal lock defines a latch for fixing the second side of terminal lock within the opening.

17. The electrical connector according to claim 9, wherein the latch end of the terminal lock is adapted to simultaneously engage with a plurality of the latches of terminals arranged within a respective one of the plurality of terminal openings.

18. An electrical connector, comprising:

a connector body, defining:

a plurality of terminal openings sized to receive a plurality of terminals; and a secondary terminal lock opening extending into the connector body and in communication with the plurality of terminal openings; and a terminal lock rotatably attached to the connector body about a rotational axis, including:

a plurality of terminal latch release arms extending from a first side of the terminal lock and aligned with the plurality of terminal openings; and a secondary terminal locking body extending from a second side of the terminal lock and adapted to be at least partially received within the secondary terminal lock opening.

19. The electrical connector according to claim 18, wherein the plurality of latch release arms and the secondary terminal locking body are arranged on distinct sides of the rotational axis of the terminal lock.

20. The electrical connector according to claim 19, wherein each of the latch release arms defines a latch surface for capturing a locking latch of a terminal received within one of the terminal openings in a locked position, and a release surface for biasing the locking latch of the terminal into an unlocked position.

* * * * *